US010739466B2

(12) United States Patent
Grobert

(10) Patent No.: US 10,739,466 B2
(45) Date of Patent: Aug. 11, 2020

(54) MITIGATION OF SPOOFER SATELLITE SIGNALS

(71) Applicant: Raytheon Company, Waltham, MA (US)

(72) Inventor: Paul H. Grobert, Granada Hills, CA (US)

(73) Assignee: Raytheon Company, Waltham, MA (US)

( * ) Notice: Subject to any disclaimer, the term of this patent is extended or adjusted under 35 U.S.C. 154(b) by 386 days.

(21) Appl. No.: 15/040,900

(22) Filed: Feb. 10, 2016

(65) Prior Publication Data

US 2017/0227650 A1 Aug. 10, 2017

(51) Int. Cl.
*G01S 19/21* (2010.01)
*H04K 3/00* (2006.01)

(52) U.S. Cl.
CPC ........... *G01S 19/215* (2013.01); *H04K 3/224* (2013.01); *H04K 3/228* (2013.01); *H04K 3/90* (2013.01); *H04K 2203/32* (2013.01); *H04K 2203/36* (2013.01)

(58) Field of Classification Search
CPC ....... G01S 19/21; G01S 19/215; H04K 3/228; H04K 3/90; H04K 3/224
See application file for complete search history.

(56) References Cited

U.S. PATENT DOCUMENTS

| 4,734,701 A * | 3/1988 | Grobert | H01Q 3/2617 342/378 |
|---|---|---|---|
| 4,734,702 A | 3/1988 | Kaplan | |
| 5,317,322 A | 5/1994 | Grobert | |
| 5,557,284 A | 9/1996 | Hartman | |
| 5,579,016 A * | 11/1996 | Wolcott | H01Q 3/22 342/378 |
| 6,147,640 A | 11/2000 | Wachs | |

(Continued)

FOREIGN PATENT DOCUMENTS

EP 0202832 A1 11/1986

OTHER PUBLICATIONS

Magiera et al ."Detection and Mitigation of GPS Spoofing Based on Antenna Array Processing". Journal of Applied Research and Technology. vol. 13. Feb. 2015. pp. 45-57 (Year: 2015).*

(Continued)

*Primary Examiner* — Gregory C. Issing

(57) ABSTRACT

A technology is described for mitigating global positioning system (GPS) spoofer signals. A potentially spoofed GPS signal received via an antenna coupled to a GPS receiver can be identified. The potentially spoofed GPS signal can be applied to a spoofer signal nulling loop to generate a set of spoofer nulling weights. The set of spoofer nulling weights can produce a direction vector associated with the potentially spoofed GPS signal. The direction vector can be compared to a beamsteering vector. The potentially spoofed GPS signal can be determined as being a spoofer GPS signal when a misalignment between the direction vector and the beamsteering vector is above a defined threshold. The spoofer GPS signal can be converted to a spoofer mitigation signal that is applied to satellite track channels of the GPS receiver. The spoofer mitigation signal can produce a spatial null in a direction of the spoofer GPS signal.

18 Claims, 13 Drawing Sheets

(56) References Cited

U.S. PATENT DOCUMENTS

| | | | | |
|---|---|---|---|---|
| 6,327,298 | B1* | 12/2001 | Grobert | G01S 19/21 342/357.59 |
| 6,388,611 | B1 | 5/2002 | Dillman | |
| 7,250,903 | B1* | 7/2007 | McDowell | G01S 19/215 342/357.59 |
| 7,525,482 | B1* | 4/2009 | Lackey | G01S 19/215 342/357.31 |
| 7,764,224 | B1* | 7/2010 | Anderson | G01S 19/215 342/357.27 |
| 2014/0327581 | A1* | 11/2014 | Murphy | G01S 3/043 342/417 |
| 2015/0116147 | A1* | 4/2015 | Jaeckle | G01S 19/215 342/357.59 |
| 2016/0146944 | A1* | 5/2016 | Geren | G01S 19/215 342/357.59 |

OTHER PUBLICATIONS

Meurer et al. "Direction of Arrival Assisted Sequential Spoofing Detection and Mitigation". Proceedings of the 2016 International Technical Meeting ION Jan. 2016. pp. 181-192. (Year: 2016).*

Montgomery et al. "A Multi-Antenna Defense, Receiver-Autonomous GPS Spoofing Detection". Inside GNSS Mar./Apr. 2009. pp. 40-46. (Year: 2009).*

Daneshmand et al., A Low-Complexity GPS Anti-Spoofing Method Using a Multi-Antenna Array, Proceedings of the 25th International Technical Meeting of The Satellite Division of the Institute of Navigation, Sep. 17-21, 2012. Nashville, TN.

Konovaltsev et al., Autonomous Spoofing Detection and Mitigation in a GNSS Receiver with an Adaptive Antenna Array, Proceedings of the 26th International Technical Meeting of The Satellite Division of the Institute of Navigation, Sep. 16-20, 2013, Nashville, TN.

International Search Report for International Application No. PCT/US2016/065951 dated Aug. 16, 2017, 14 pages.

* cited by examiner

Spoofer location:
40 degrees azimuth, 10 degrees elevation

Using spoofer nulling loop weights to form an antenna "sky map" provides spoofer azimuth/elevation measurement capability

| 0  | 5   | 6   | 7   | 8   | 9   | 10  | 11  | 12  | 13  | 14  | 15  |
|----|-----|-----|-----|-----|-----|-----|-----|-----|-----|-----|-----|
| 50 | 1   | 1   | 1   | 1   | 2   | 2   | 2   | 2   | 3   | 3   | 3   |
| 49 | 0   | 0   | 0   | 1   | 1   | 1   | 1   | 2   | 2   | 2   | 3   |
| 48 | 0   | 0   | 0   | 0   | 0   | 0   | 1   | 1   | 1   | 2   | 2   |
| 47 | -1  | -1  | 0   | 0   | 0   | 0   | 0   | 0   | 0   | 1   | 1   |
| 46 | -2  | -2  | -2  | -1  | -1  | -1  | 0   | 0   | 0   | 0   | 0   |
| 45 | -4  | -4  | -3  | -3  | -3  | -2  | -2  | -1  | -1  | 0   | 0   |
| 44 | -6  | -6  | -5  | -5  | -4  | -4  | -3  | -3  | -2  | -2  | -1  |
| 43 | -9  | -9  | -8  | -7  | -7  | -6  | -5  | -5  | -4  | -3  | -3  |
| 42 | -14 | -13 | -12 | -11 | -10 | -9  | -8  | -7  | -6  | -5  | -5  |
| 41 | 28  | 25  | 22  | 20  | 17  | 15  | 13  | 12  | 10  | 9   | 7   |
| 40 | -17 | -18 | -20 | -23 | -29 | -53 | -27 | -21 | -17 | -14 | -12 |
| 39 | -10 | -10 | -11 | -12 | -13 | -15 | -17 | -21 | -27 | -28 | -21 |
| 38 | -6  | -6  | -7  | -7  | -8  | -9  | -10 | -11 | -13 | -16 | -19 |
| 37 | -3  | -3  | -4  | -4  | -5  | -5  | -6  | -7  | -8  | -9  | -11 |
| 36 | -1  | -1  | -1  | -2  | -2  | -3  | -3  | -4  | -4  | -5  | -6  |
| 35 | 0   | 0   | 0   | 0   | 0   | -1  | -1  | -1  | -2  | -3  | -3  |
| 34 | 1   | 1   | 1   | 1   | 0   | 0   | 0   | 0   | 0   | 0   | -1  |
| 33 | 3   | 2   | 2   | 2   | 2   | 2   | 1   | 1   | 1   | 0   | 0   |
| 32 | 4   | 4   | 3   | 3   | 3   | 3   | 3   | 2   | 2   | 2   | 1   |
| 31 | 5   | 5   | 5   | 4   | 4   | 4   | 4   | 4   | 3   | 3   | 3   |
| 30 | 6   | 6   | 5   | 5   | 5   | 5   | 5   | 5   | 4   | 4   | 4   |

*FIG. 9*

MITIGATION OF SPOOFER SATELLITE SIGNALS

BACKGROUND

It is known that satellite navigation signals can be spoofed; such as to disrupt aircraft operations and/or to crash an aircraft. In general, a satellite system spoofing attack, such as a global positioning system (GPS) spoofing attack, can attempt to deceive a satellite receiver by broadcasting a spoofed signal with greater signal strength as compared to the satellite navigation signal. The spoofed signal can cause the satellite receiver to incorrectly determine its location. For example, the spoofed signal can falsely communicate a position that is any number of degrees off of the satellite receiver's actual position. As a result; the satellite receiver can falsely determine that the aircraft is off course, even though the aircraft is traveling along a correct heading or course and in the correct orientation/position. As a result, the aircraft may adjust its orientation to correspond with the spoofed signal, thereby causing the aircraft to travel off course. Where satellite spoofing may trick a navigation system by communicating spoofed signals, it is further known that satellite jammers may prevent satellite receivers from receiving satellite signals altogether.

BRIEF DESCRIPTION OF THE DRAWINGS

Features and advantages of the disclosure will be apparent from the detailed description which follows; taken in conjunction with the accompanying drawings, which together illustrate, by way of example; features of the disclosure; and, wherein:

FIG. 9 illustrates an antenna sky map pattern using spoofer nulling weights in accordance with an example;

Figure 1:
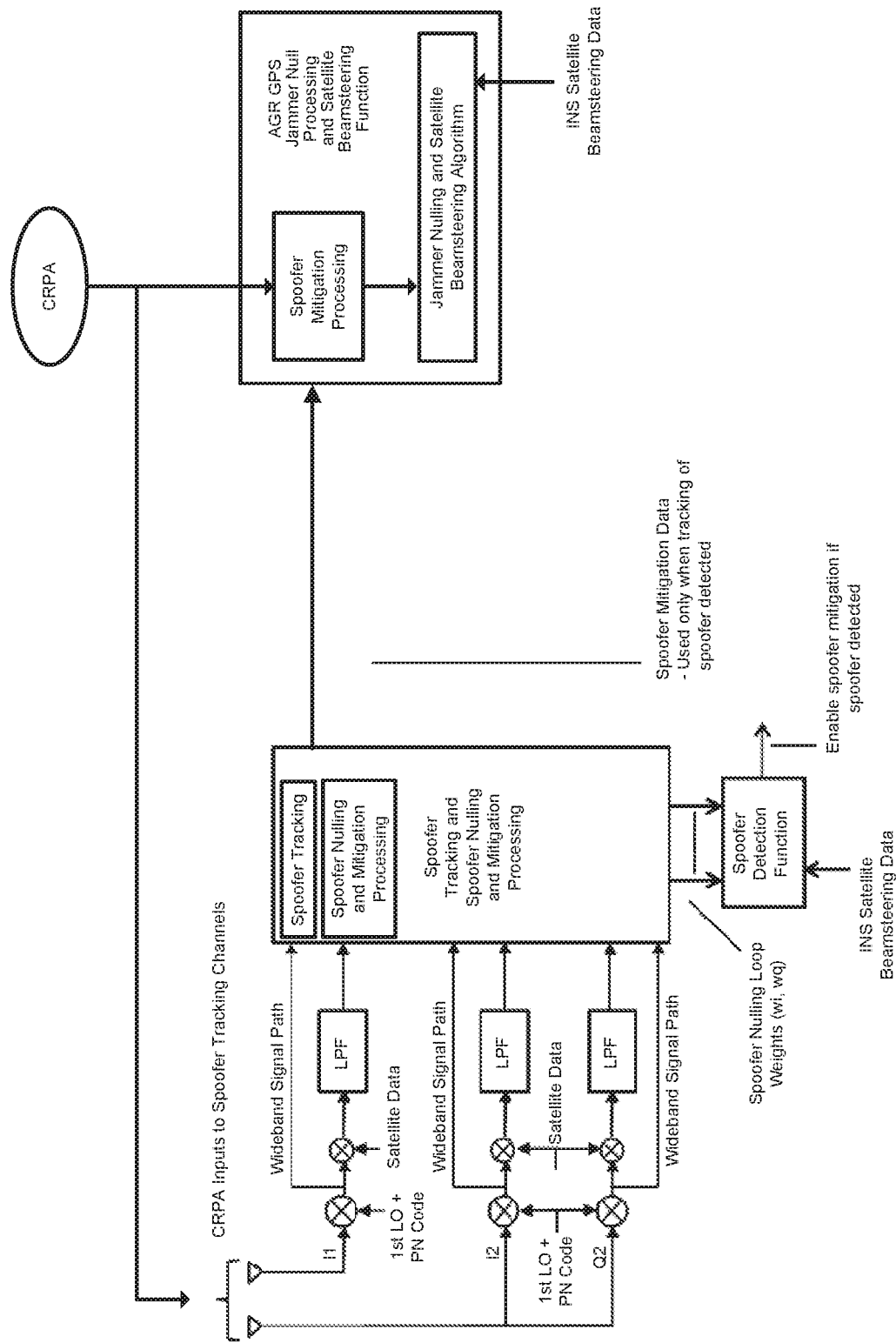
FIG. 1 illustrates a system for tracking and mitigating a spoofer global positioning system (GPS) signal in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The emergence of sophisticated enemy or other adversary spoofing techniques threatens the use of global positioning system (GPS) on aircraft and weapon systems, such as a self-propelled precision-guided munition system. If spoofer signals are not detected and mitigated, a GPS-enabled aircraft or weapon system can be guided away from an intended course or target or guided along an incorrect course or to an incorrect target. Typically, after using radar to track the aircraft or weapon system, a spoofer can produce a replica of a GPS signal at a power level that is greater than real or genuine GPS signals, which can enable the spoofer to capture a target GPS receiver's code and carrier tracking loops. The spoofer can impinge on the target GPS antenna/receiver, thereby allowing the spoofer to capture the target GPS receiver onboard the aircraft or weapon system.

In prior solutions used to address spoofer GPS signals, an angle of arrival (AOA) of a GPS signal can be measured, and the AOA can be compared to a known direction of a GPS signal. Based on the comparison, if the AOA of the GPS signal is not within a defined threshold of the known direction, then the GPS signal can be concluded as being a spoofer signal. However, prior solutions do not provide capabilities for mitigating the spoofer signal. Rather, the spoofer signal that is being tracked can be dropped, and a GPS receiver can attempt to reacquire a "real" GPS satellite (as opposed to another spoofer GPS signal). After acquiring another GPS satellite, the AOA of a corresponding signal is compared to a known direction, and so on.

Moreover, previous solutions that attempt to identify and mitigate the effect of enemy-spoofer GPS signals can fall into several categories: (1) using two fixed reception path antennas (FRPAs) with independent receiver tracking channels that are tracking a same satellite; (2) forming an inertial navigation system (INS) pointed beam, using a multi-element control pattern reception antenna (CPRA), towards the GPS satellite and dithering a beam in azimuth and elevation to observe an increase or decrease in a carrier-to-noisedensity ratio (C/No); and (3) using a CRPA to measure an AOA of a tracked satellite (or spoofer) and forming a vector to place a null in a direction of the tracked satellite. With respect to the first category, previous solutions do not describe suppressing an effect of the spoofer signal. With respect to the second category, previous solutions are ineffective when the spoofer and a real GPS satellite are not spatially separated in a sufficient manner. In addition, the influence of jamming on an adapted antenna pattern can potentially result in misleading conclusions regarding a signal level of the real GPS satellite versus the spoofer (i.e., a source of spoofer signals). With respect to the third category, previous solutions are ineffective in the presence of jamming.

As described in further detail below, the present technology provides a spoofer auto-tracking and mitigation technique that can be used to detect, track and null a spoofer signal without knowing a location of the spoofer. In one example, the spoofer auto-tracking and mitigation technique can be implemented in conjunction with a multi-element GPS receiver (e.g., CRPA) and a high anti-jam GPS receiver. The spoofer auto-tracking and mitigation technique can utilize spatial adaptive interference cancellation. More specifically, the spoofer GPS signal can be converted into a jamming signal, and then applied to a GPS receiver satellite tracking channel that is tracking a corresponding satellite. The jamming signal can appear to the GPS receiver satellite tracking channel as a jammer, which can result in a sharp spatial nulling being formed in a direction of the spoofer signal. The spatial null, in the direction of the spoofer signal transmission, can prevent the GPS receiver satellite tracking channel from detecting and tracking the spoofer signal, thereby preventing the spoofer signal from capturing and taking over the GPS receiver. The spoofer auto-tracking and mitigation technique can be effective in the presence of jamming. In one example, the spoofer auto-tracking and mitigation technique can effectively protect the GPS receiver from repeated attempts by the spoofer to capture and disrupt signal tracking at the GPS receiver. In one example, multiple spoofer auto-tracking and mitigation loops can be employed to provide protection against a spoofer attack from multiple directions. In addition, the spoofer auto-tracking and mitigation technique may not place a spatial null towards a real GPS satellite.

As described in further detail below, an output of the GPS antenna (e.g., CRPA) can be applied to both a spoofer tracking and nulling channel and a GPS satellite tracking channel of the GPS receiver. Spoofer signal processing at the GPS receiver can include a wideband path and a low pass filtered narrow band path. The wideband path can be used to correlate and track the spoofer signal. In one example, a data message present on the spoofer signal is demodulated and used to "wipe-off" data bits on the spoofer signal, which enables the reconstructed spoofer carrier signal to be filtered by a low pass filter on the low pass filtered narrow band path. By processing the reconstructed spoofer carrier signal in a narrow band, a spoofer mitigation signal can be generated that is applied to the GPS satellite tracking channel. In one example, the low pass filtered path spoofer signal can be applied to a spoofer nulling loop and used to generate a set of spoofer nulling weights (or spoofer nulling loop weights). The spoofer nulling weights can form a direction vector that points in the direction of the spoofer signal transmission. The direction vector can be compared to an inertial navigation system (INS) beamsteering vector that is used by the GPS receiver to point an antenna beam towards the GPS satellite. By comparing these two vectors, it can be determined if the GPS satellite tracking channel is tracking the correct satellite or tracking a spoofer that has managed to "take control" of the GPS receiver. If it is determined that a spoofer has captured a GPS satellite tracking channel of the GPS receiver, then low pass filtered spoofer mitigation data can be applied to the GPS satellite tracking channel, which results in a sharp spatial null being formed in the direction of the spoofer signal, thereby ensuring that the GPS satellite tracking channel is tracking a real satellite. In addition, to ensure that the spoofer nulling weights form a vector that points in the direction of the spoofer signal, a complex Gaussian noise can be used to modulate spoofer nulling loop low pass filter output signals.

In one example, the GPS receiver can have up to 16 GPS satellite tracking channels for tracking GPS satellites. Typically, only 12 satellites can be viewed at a given time, so 12 channels out of the 16 channels can be used to track satellites, while the remaining 4 channels can be dedicated to tracking a spoofer. A given GPS satellite tracking channel can be selected for tracking a defined spoofer signal. A carrier of the spoofer signal can be reconstructed to produce a reconstructed spoofer carrier signal, and the reconstructed spoofer carrier signal can be converted to a jamming signal. The jamming signal can be applied to all of the other GPS satellite tracking channels. In other words, from the perspective of each of the GPS satellite tracking channels, a jamming signal is coming from the direction of the spoofer. As a result, a spatial null is produced in the direction of the spoofer, and the GPS satellite tracking channels may not be impacted by the spoofer.

In one example, sophisticated spoofing techniques involve targeting a GPS receiver with multiple copies of a spoofer signal. Adversaries (or anyone wishing to spoof the GPS receiver, generally referred to herein as "adversaries") can track an airborne platform or weapon system using radar, and then generate a bogus replica constellation of satellites. If a GPS receiver locks onto the bogus replica constellation, the GPS receiver can become out of position. Moreover, adversaries can have multiple copies of that spoofer in space, so the GPS receiver can be hit multiple times with the bogus replica constellation of satellites. In accordance with previous solutions, measuring the AOAs of signals can be insufficient to effectively detecting the spoofer signals. However, in accordance with the present technology, a spatial null is placed in the direction of each spoofer signal. In addition, one or more GPS satellite tracking channels are dedicated to tracking the spoofer and providing a jamming-like signal to all of the other GPS satellite tracking channels. So as new copies of the bogus replica constellation arrive at the GPS receiver's antenna, the GPS satellite tracking channels can have a spatial null in that direction, which causes the spoofer signal to be disregarded.

FIG. 1 illustrates an exemplary system for tracking and mitigating a spoofer global positioning system (GPS) signal. More specifically, FIG. 1 illustrates a GPS satellite tracking channel for tracking a GPS satellite. Each GPS satellite tracking channel of a GPS receiver can implement a spoofer tracking and mitigation technique. In other words, one or more of the GPS satellite tracking channels can be assigned to tracking the spoofer and providing jammer data to the other GPS satellite tracking channels, and one or more of the GPS satellite tracking channels can be used to track real GPS satellites. As shown in FIG. 1, a spoofer processing functional block can be used to track the spoofer, and then generate mitigation data. The mitigation data can be provided to a spoofer mitigation processing functional block, which can perform jammer nulling (i.e., producing a jammer signal to produce a spatial null in the direction of the spoofer).

In one example, antenna outputs (e.g., CRPA outputs) can be applied to both spoofer tracking functions and anti-jam GPS receiver (AGR) processing functions. These two processing functions (or paths) can be implemented in a digital baseband processor of a GPS receiver. A signal received at the antenna, which can be a potentially spoofed GPS signal, can be divided into I1, I2 and Q2 components. At each of the I1, I2 and Q2 components, there is an antenna input as well as an input of the GPS receiver's first local oscillator (1$^{st}$ LO) multiplied by a locally generated spoofer pseudo noise (PN) code; which enables the GPS receiver's down converter to translate the L band signal to baseband and correlate the signal. If the received signal is a spoofer signal, then the PN code can be identical to a real GPS satellite code that the spoofer is attempting to mimic. Alternatively, other techniques can be used to correlate the received spoofer signal.

In one example, the spoofer processing functional block can include a wideband signal path and a low pass filter (LPF) signal path. The wideband path can be used to correlate and track the spoofer signal. In the LPF signal path, a data message present on the spoofer signal can be demodulated and used to "wipe-off" or erase data bits on the spoofer signal, which enables the spoofer signal to pass through a LPF. In one example, the LPF can be set to 4 Hz. The "data wipe-off" signal is derived from a decision feedback circuit which enables the data to be available at the beginning of the data bit interval (20 milliseconds) rather than at the end of the data bit interval.

In one example, the LPF signal path can be used to generate spoofer nulling weights (wi, wq). The spoofer nulling weights can form a direction vector that points in the direction of the spoofer signal transmission. The direction vector can be compared to an inertial navigation system (INS) beamsteering vector that is used by the GPS receiver to point an antenna beam towards the GPS satellite. The comparison can be performed at a spoofer detection functional block, as shown in FIG. 1. By comparing these two vectors, it can be determined if a GPS satellite tracking channel is tracking the correct satellite or tracking a spoofer that has managed to "take control" of the GPS receiver.

In one example, if a spoofer has captured the GPS satellite tracking channel, then spoofer mitigation data can be applied to the GPS satellite tracking channels. For example, the LPF signal path can provide a narrow band filtered version of a spoofer reconstructed carrier signal for use in generating a spoofer mitigation signal. The use of the narrow band to process the spoofer reconstructed carrier signal provides a high signal-to-noise ratio (SNR) to form the spoofer mitigation signal. The spoofer mitigation signal can appear to the GPS satellite tracking channel as a "jamming signal" which arrives at a GPS receiver antenna, such as a CRPA, from the direction of the spoofer signal transmission. In response to the "jamming signal," a GPS signal processing function can place a sharp spatial null in the direction of the spoofer signal transmission. Therefore, the GPS satellite track channels can disregard the spoofer signal and resume tracking the real satellite.

As an example, spoofer suppression can range from 20 decibels (db) to 50 db, depending on a spoofer signal level. The spoofer signal can be nulled close to the GPS receiver's thermal noise floor, which enables the GPS satellite tracking channel to track the real satellite while ignoring the spoofer signal. As an example, the spoofer signal can be presented to the GPS satellite tracking channel as an 80 db jamming-to-signal (J/S) jammer. In other words, the J/S ratio in db can be a value of 80. In addition, each antenna channel I and components can have amplitude and phase characteristics associated with a jammer received from the direction of the spoofer signal transmission. Thus, each GPS satellite tracking channel can identify the spoofer mitigation signal as a jammer, and responds by placing a sharp spatial null in the direction of the spoofer signal transmission.

In one example, a typical satellite signal level received by the GPS receiver is nominally 45 decibels hertz (db-Hz). The spoofer signal levels potentially used by adversaries or hostile forces attempting to capture and take over control of the GPS receiver's navigation function can be approximately 5 to 10 db-Hz above the 45 db-Hz value. To ensure robust mitigation performance, the spoofer auto-tracking and mitigation technique can function over a wide range of signal levels. For example, the spoofer auto-tracking and mitigation technique can function at levels as low as 26 db-Hz, which is the threshold of coherent carrier tracking, to levels that are greater than 70 db-Hz.

Another technique that can be utilized by adversarial spoofing is to include a noise floor in the spoofer signal transmission that attempts to mask the spoofer signal, such that the spoofer signal does not stand out above the GPS receiver's noise floor. In this case, the spoofer can attempt to have a target GPS receiver's automatic gain control (AGC) normalize the spoofer signal plus a transmitted noise floor to appear to be a real GPS signal. Therefore, a spoofer level of 60 db carrier power to noise power (C/No) can be accompanied by a noise floor that is equivalent to a broadband jamming level (e.g., 60 db SS). As discussed below, the spoofer auto-tracking and mitigation technique can effectively null both the spoofer and its associated noise floor jamming down to the level of the GPS receiver's noise floor. To further ensure robust operation, the spoofer auto-tracking and mitigation technique can provide effective spatial nulling of the spoofer in the presence of enemy jamming (or red jamming). The spoofer is not generally used in conjunction with levels of enemy jamming since the presence of hostile jamming can potentially defeat the purpose of the spoofing signal, which is to capture and take control of the GPS receiver's navigation function. However, in the interest of robust performance, the spoofer auto-tracking and mitigation technique can be successfully performed in the presence of hostile jamming levels, which can be around 70 db J/S, or higher, while the spoofer signal C/No level can be as low as 40 db-Hz.

Figure 2:
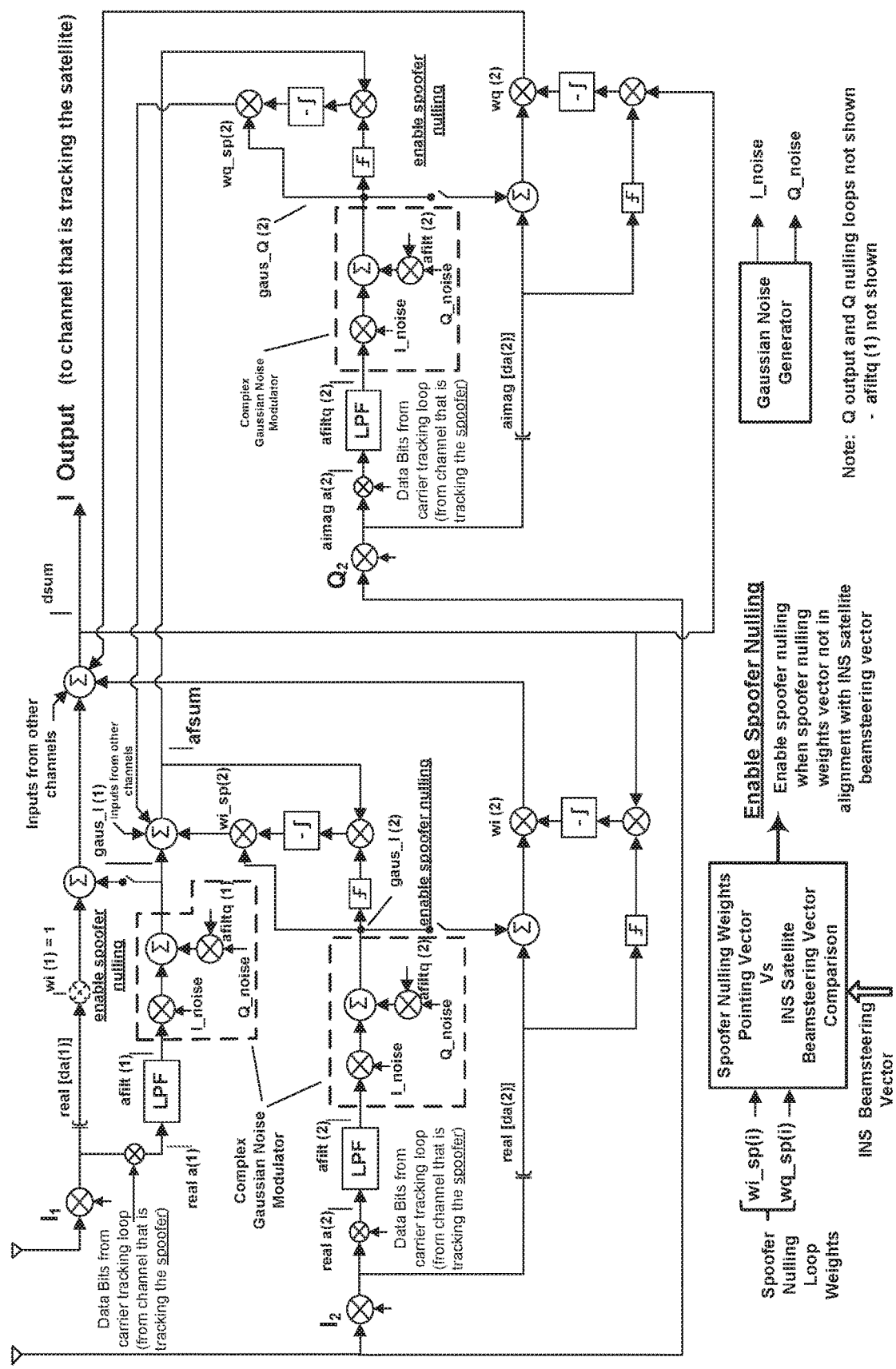
FIG. 2 illustrates a block diagram for tracking and mitigating a spoofer global positioning system (GPS) signal in accordance with an example.

FIG. 2 illustrates an exemplary block diagram for tracking and mitigating a spoofer global positioning system (GPS) signal. More specifically, the block diagram illustrates a spoofer auto-tracking and mitigation technique that is implemented in a baseband processor of a GPS receiver. A two antenna channel model can be utilized, wherein channel 1 is a reference channel for adaptive interference cancellation processing and channel 2 is an auxiliary channel. In one example, channels 2 through 7 can be auxiliary channels. In another example, a 5 or 7 element antenna can be used for GPS adaptive interference cancellation.

In one example, antenna inputs can be provided to spoofer tracking channels, such as channel 1 and channel 2. Each channel can include an I component (e.g., I1 and I2) and a Q component (e.g., Q1 and Q2). In one example, a nulled I1 portion of the reference channel (shown as dsum) can be used to derive the I output (in-phase component of the satellite or spoofer signal), which is applied to GPS receiver tracking and detection functions. While nulled Q1 is not shown, it is similar to the nulled I1 portion of the block diagram.

In one example, the block diagram includes two jammer nulling loops. An "outer loop" can represent a main GPS receiver satellite tracking and jammer nulling loop, while an "inner loop" can represent a spoofer tracking and mitigation loop. The "outer loop" and "inner loop" are further explained below.

In one example, the GPS receiver, such as an AGR GPS receiver, can include multiple GPS satellite tracking channels. In one example, 32 channels are implemented for tracking on the GPS L1 and L2 frequencies. Each of the 32 channels can include both a satellite tracking function and a spoofer mitigation function. In operation, 12 channels on L1 and 12 channels on L2 can be assigned to track GPS satellites while remaining channels can be designated as spoofer mitigation channels. When assigned to perform spoofer mitigation, a particular channel can both track the spoofer and provide spoofer mitigation data to the other satellite tracking channels.

Figure 3:
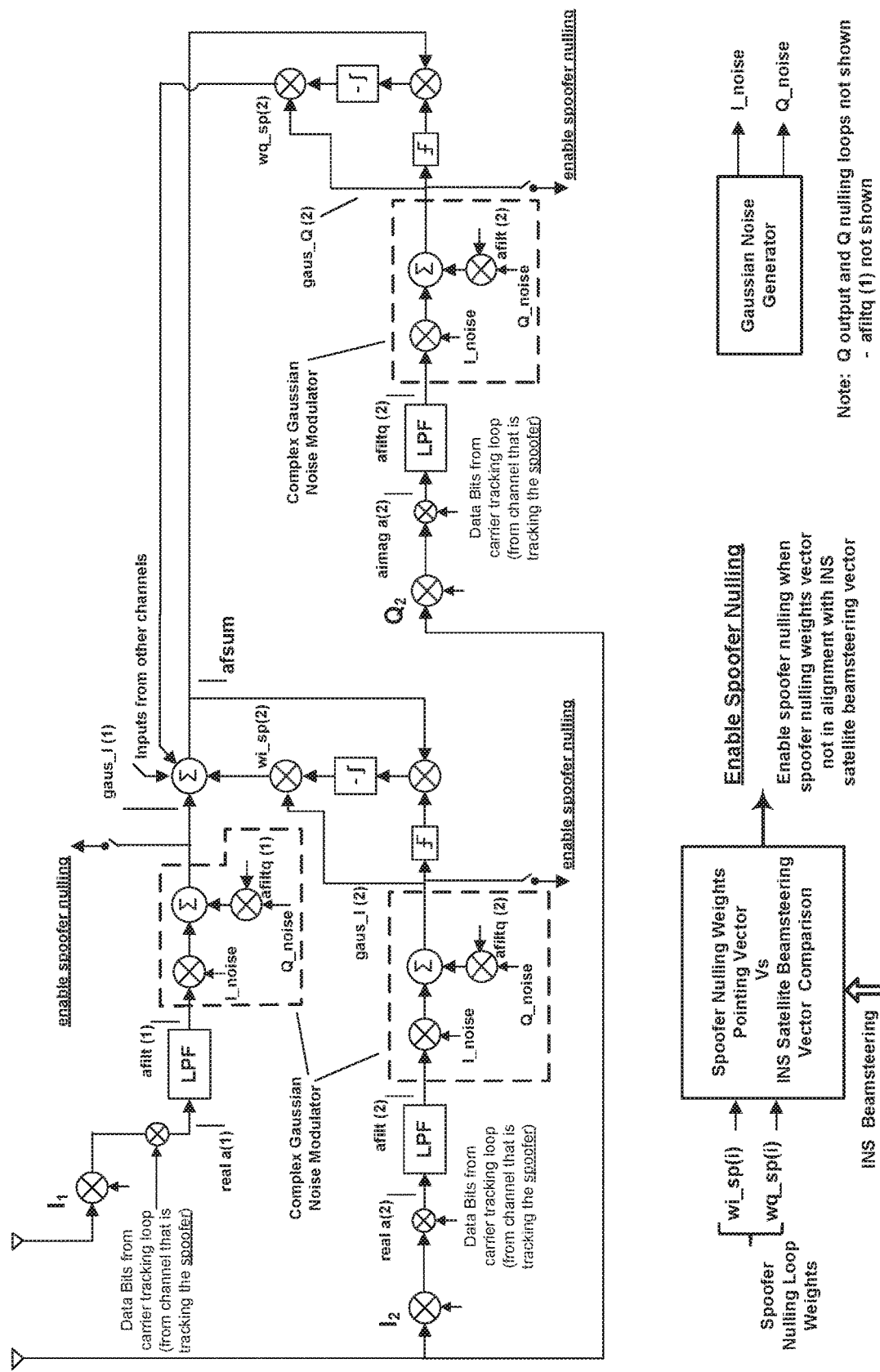
FIG. 3 illustrates a block diagram of an inner loop for tracking and mitigating a spoofer global positioning system (GPS) signal in accordance with an example.

FIG. 3 illustrates an exemplary block diagram of an inner loop for tracking and mitigating a spoofer global positioning system (GPS) signal. The inner loop portion can perform two functions. A first function is to convert a tracked spoofer signal into a jamming signal, which is then applied to a main satellite tracking loop (also referred to as an outer loop). The jamming signal can result in a spatial null, in the direction of the spoofer signal transmission, in an adapted antenna pattern of the main satellite tracking loop (or outer loop). The jamming signal can be provided through a switch (referred to as 'enable spoofer nulling'). A second function is to place a spatial null in the direction of the spoofer signal transmission, which provides a set of nulling weights that are used to determine if a tracked signal (i.e., a potentially spoofed GPS signal) is arriving from the direction of the real satellite or whether the tracked signal is arriving from another direction (which implies that the tracked signal is a spoofer signal).

As shown in FIG. 3, a spoofer signal can be provided to a channel 1 low pass filter (LPF), and an output of the channel 1 LPF (which is represented by afilt(1)) contains an I component (in-phase component) of a reconstructed spoofer carrier signal. Note that the Q1 channel is not shown, but as mentioned above, the Q1 channel is similar to the I1 channel. The I and Q components of all the antenna element channels can include the reconstructed carrier of the tracked spoofer signal, which can be used to provide nulling weights for determining the direction of arrival of the spoofer signal.

In one example, the I1 channel signal component can be represented as real a(1), and the I(2) and Q(2) channel signal components can be represented as real a(2) and aimag a(2), respectively. In addition, an output of the LPF can be used to form a null in the direction of the spoofer signal. Therefore, when a spoofer nulling weight pointing vector (or direction vector) indicates that the spoofer signal being received is not from the direction of the GPS satellite, the LPF outputs can be applied to the satellite tracking channel, which results in the formation of an antenna null in the direction of the spoofer signal.

In one example, a first input to I1, I2 and Q2 is a signal (e.g., a spoofer signal) from the antenna, and a second input is a first local oscillator (LO). Before the signal is provided to a mixer, the signal is multiplied by a pseudo noise (PN) code, which spreads the LO and simultaneously performs a down conversion and correlation (e.g., the correlation of a spreading code). On the GPS receiver, the PN code is applied to the first LO (also referred to as an offline correlation). As a result, the signal can be down converted, and a carrier of the satellite or spoofer can be reconstructed.

In one example, a 50 bits per second GPS satellite data message can be removed from the received signal (or spoofer signal) to enable the use of the LPF. In other words, the data message can be removed prior to the spoofer signal being provided to the LPF. In order to form a deep spatial null in the direction of the satellite or the spoofer, the LPF can be used to improve the signal to noise (SNR) ratio of the satellite or spoofer reconstructed carrier signal.

In one example, with the improved SNR ratio, the spoofer mitigation algorithm nulling weights may not form a vector that correctly points in the direction of the spoofer. Therefore, to ensure that these nulling weights form pointing vectors that are correctly in the direction of the spoofer, a complex Gaussian noise modulator can be used to convert the I and Q signals into signals that resemble a jammer that has been processed by a post correlation nulling processing receiver. As a result, strong jamming can be achieved not with direct current (DC) components, but rather with quadrature Gaussian components of a correct proportion between I and Q to point the null in the direction of the spoofer signal.

As shown in the two channel model, the outputs of the LPFs, afilt(1), afilt(2) and afiltq(2), can be multiplied by the signals I_noise and Q_noise in the complex Gaussian noise modulators, respectively. These noise signals are generated in a Gaussian noise generator. The output of the complex Gaussian noise modulators, gaus_I(1), gaus_I(2) and gaus_Q(2), are the desired spoofer jamming signals in channels 1 and 2 that are applied to the GPS satellite tracking channels.

As shown in FIG. 3, gaus_I(1), gaus_I(2) and gaus_Q(2) can also be applied to a nulling loop which forms a spatial null in the direction of the spoofer. Before the summation, the gaus_I(2) and gaus_Q(2) signals can be applied to the nulling weights wi_sp(2) and wq_sp(2). The nulling weights in this loop are then used to determine the direction of the received spoofer signal. In the two channel model, gaus_I(1) is the spoofer "jamming signal" at the output of channel 1(I) while gaus_I(2) and gaus_Q(2) are the spoofer "jamming signals" at the outputs of channel 2(I) and channel 2(Q). The I and Q "jamming signals" are used to drive a least mean square (LMS) spoofer loop nulling algorithm. However, other types of jammer nulling loops can be employed to perform the nulling, such as a minimum variance nulling algorithm.

In one example, an output of the summation function, afsum, is driven to a zero value by the action of the LMS nulling loop. The output of the summation function (afsum) and a 1 bit quantized version of gaus_I(2) and gaus_Q(2) can be applied to cross-multiplier functions, which feed integrators that form the LMS nulling function. In a nulling loop (such as an LMS nulling loop), jamming signals come through and the goal is to null the jamming signals. The objective of the nulling loop is to drive the 'afsum' to a zero value. In doing so, a spatial null is effectively produced in the direction of the received spoofer signal in the adaptive antenna pattern. For example, the LMS nulling loop can take 'afsum', and cross multiplication feeds an accumulator or integrator (with a minus sign) to drive the nulling weight. The LMS nulling loop can adjust the nulling weight so 'afsum' goes to zero, and this can be performed in conjunction with the I and Q components of each of the auxiliary channels (as shown in the inputs from other channels being provided to the summation). The LMS nulling loop can automatically adjust the weight value of W and Wq, such that 'afsum' is equal to zero. Other types of nulling algorithms can perform similar functions to derive the nulling weights.

In one example, the spoofer nulling weights (Wi and Wq) can be used to form a direction vector that points in the direction of the spoofer (or satellite if no spoofer is present). As shown in FIG. 3, the direction vector is compared to a direction if an INS beamsteering vector, which is supplied by an inertial aiding system and used to aid the GPS receiver tracking loops. The INS beamsteering vector can be used to point an antenna beam in the direction of the GPS satellites, which improves the GPS satellite signal tracking performance in the GPS receiver. The INS beamsteering vector can be provided to the GPS receiver by an INS. The INS can provide a roll, pitch and yaw of the aircraft or weapon system on which the INS is onboard. In the GPS receiver, for the GPS satellite track channels, an open loop beam can be steered in the direction of the satellite using INS aiding. A position of the GPS satellites can be previously known based on an almanac. The spoofer nulling weights (or direction vector) can be compared to the INS beamsteering vector, which effectively compares a direction of arrival of the signal being tracked (e.g., a potentially spoofed signal) and a direction at which the INS beamsteering vector is pointing. Based on the comparison, if the direction vector and the INS beamsteering vector are aligned to within a defined number of degrees (e.g., 10-15 degrees), then the received signal can be assumed to be a real GPS signal and not a spoofer signal. In this case, a spoofer nulling switch can be open (i.e., spoofer mitigation data is not applied to the GPS satellite tracking channels). On the other hand, if the degree separation (or alignment) between the direction vector and the INS beamsteering vector is outside a defined number of degrees (e.g., greater than 15 degrees), then the spoofer nulling switch can be closed to enable spoofer nulling (i.e., spoofer mitigation data is applied to the GPS satellite tracking channels).

Figure 4:
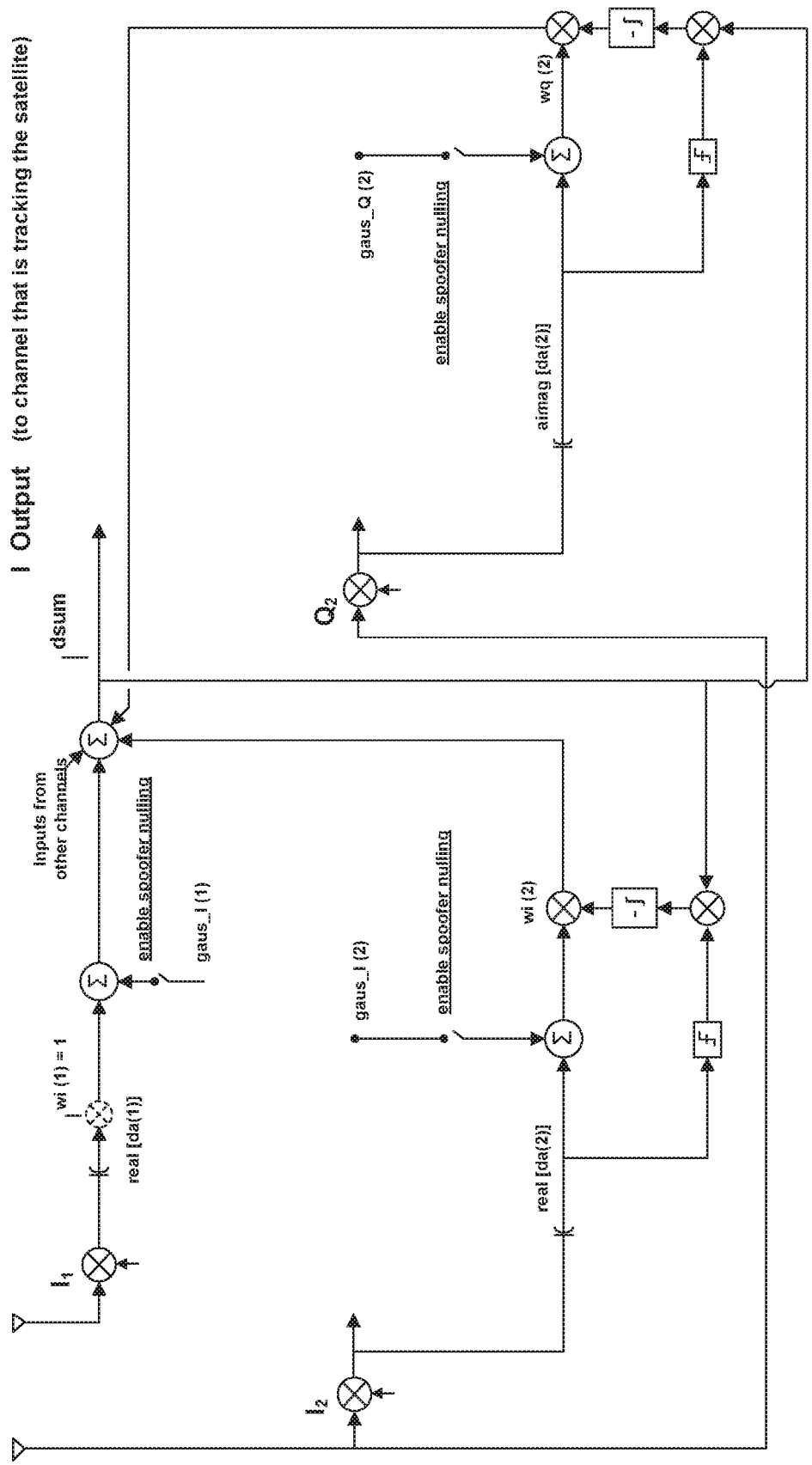
FIG. 4 illustrates a block diagram of an outer loop for tracking and mitigating a spoofer global positioning system (GPS) signal in accordance with an example.

FIG. 4 illustrates an exemplary block diagram of an outer loop for tracking and mitigating a spoofer global positioning system (GPS) signal. The outer loop can be part of a spoofer auto-tracking and mitigation technique that is implemented in a baseband processor of a GPS receiver. The outer loop can function to track a GPS satellite while providing adaptive interference cancellation of hostile jamming (or red jamming). In one example, a 5 or 7 element antenna can be used to provide the adaptive interference cancellation function. In addition, inertial navigation system (INS)-aided satellite beamsteering can be applied to the outer loop to improve satellite signal tracking in the GPS receiver in the presence of hostile jamming.

As shown in FIG. 4, additional "jammer nulling signals" or spoofer mitigation signals can be provided. These spoofer mitigation signals (gaus_I(1), gaus_I(2) and gaus_Q(2)) can be derived from the spoofer mitigation "inner loop," as described above. In one example, the outer loop can utilize a least mean square (LMS) nulling algorithm to provide the adaptive interference cancellation function, or other types of nulling functions can be employed.

In one example, the operation of the LMS nulling algorithm for the outer loop is similar to the LMS nulling algorithm utilized for the inner loop, as described above. However, in the outer loop, the LMS nulling algorithm does not employ a low pass filter (LPF) or data wipe-off functions. In addition, the signals that are applied to the LMS nulling algorithm are shown as real (da(1)), real da(2)) and aimag da(2)). These terms are derived after alternating current (AC) coupling capacitors, as shown in FIG. 4, and are intended to not pass a reconstructed satellite carrier component since it is desired to not cancel the satellite carrier signal. The AC Coupling can be accomplished by taking "first differences" in the signal processing paths shown. Since the adaptive interference cancellation technique utilizes post correlation null processing, a jammer is converted into baseband Gaussian noise which is coupled across the AC coupling capacitors and hence, is applied to the LMS nulling algorithm. In addition, spoofer jamming signals, gaus_I(n), can be added to the input to the LMS algorithm (if spoofing is detected) after the AC coupling, thereby enabling a spatial null to be generated in the direction of the spoofer in the adapted antenna pattern.

In one configuration, the spoofer auto-tracking and mitigation technique described above can be used to mitigate the effect of GPS spoofing on the GPS satellite tracking channel. In addition, the spoofer auto-tracking and mitigation technique can be used to provide a home on spoofer capability. In particular, the gaus_I/Q(n) spoofer jamming signals, which are used to form a spatial null in the direction of the spoofer in the adapted antenna pattern of the GPS satellite tracking channel, can also be applied to a home on spoofer control loop for use in guiding a vehicle towards the source of the spoofer signal transmission.

Figure 5:
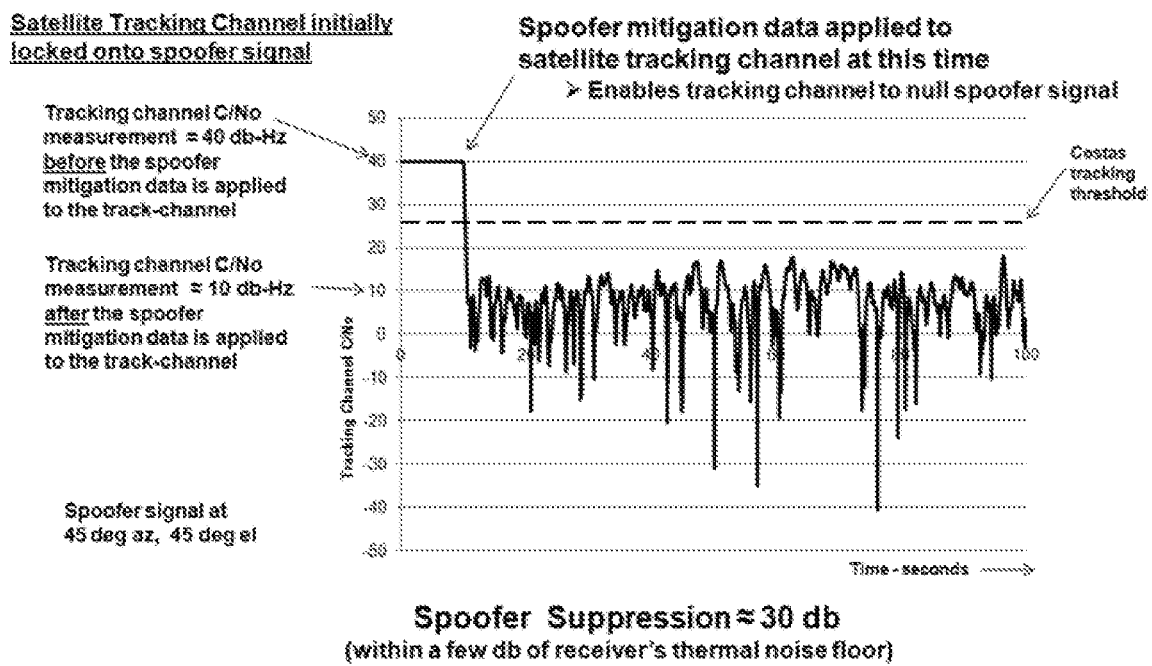
FIG. 5 illustrates simulation results for a defined spoofer level and no hostile jamming in accordance with an example.

FIG. 5 illustrates exemplary simulation results for a defined spoofer level and no hostile jamming. In the simulation results, the GPS receiver detection and tracking loop functions iterate once per millisecond (ms), as in a real GPS receiver. The simulation results illustrate an adapted antenna pattern gain scaled to an input C/No value. Before spoofer mitigation data is applied to a GPS satellite track channel, the adapted antenna gain is equal to 0 db. Hence, the Y axis of the graph shows a starting C/No value.

As shown in FIG. 5, the spoofer level of C/No is equal to 40 db-Hz and there is no red jamming. The spoofer signal is at 45 degrees azimuth and 45 degrees elevation. The simulation is run for 100 seconds with the GPS satellite tracking channel locked onto the spoofer signal for the first 10 seconds. In this case, at an initial time, the GPS receiver's tracking channel C/No measurement is at 40 db-Hz. In other words, the 40 db-Hz measurement is before spoofer mitigation data is applied to the GPS receiver tracking channel. The measured signal level of 40 db-Hz is above the Costas tracking loop threshold level of 26 db-Hz. At 10 seconds into the simulation, the spoofer mitigation data is applied to the GPS satellite tracking channel, which results in the GPS satellite tracking channel placing a spatial null in the direction of the spoofer signal transmission. As shown, the C/No level is suppressed by approximately 30 db, to an average value of approximately 10 db-Hz or less, which is below the 26 db-Hz Costas loop tracking threshold.

In one example, when the GPS receiver's track channel control logic determines that a spoofer signal has been detected and that the spoofer mitigation data has been applied to the GPS satellite track channel, the track channel control logic can initiate a satellite reacquisition search to re-establish proper satellite tracking. The presence of the spoofer mitigation data can enable the GPS satellite track channel to reacquire a correct satellite. Once the GPS satellite track channel has successfully reacquired the satellite, the spoofer mitigation data (which nulls the spoofer signal) can prevent the GPS satellite tracking channel from again being captured by the spoofer (if the spoofer again tries to disrupt and capture the channel). This is the result of the real satellite signal level, which may be 40 db-Hz or higher, not being affected by the nulled spoofer signal level, which is in the vicinity of 10 db-Hz or lower.

Figure 6:
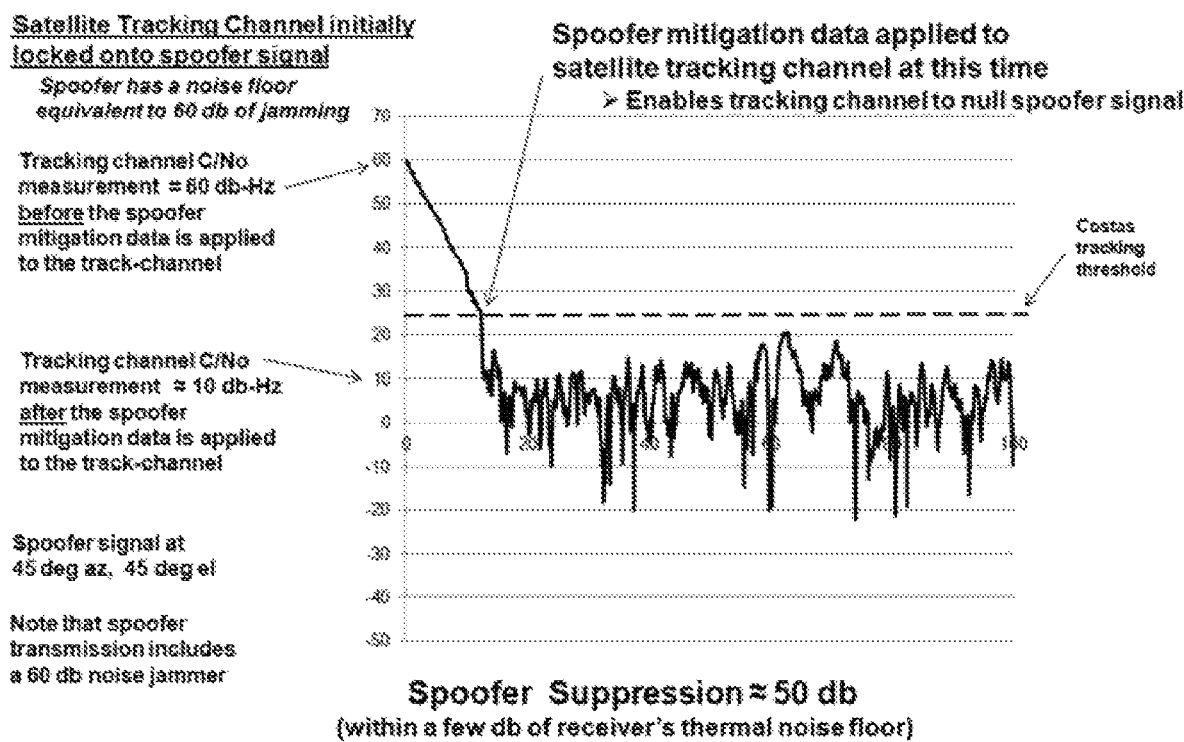
FIG. 6 illustrates simulation results for a defined spoofer level and noise jamming in accordance with an example.

FIG. 6 illustrates exemplary simulation results for a defined spoofer level and noise jamming. The simulation results illustrate an adapted antenna pattern gain scaled to an input C/No value. As shown in FIG. 6, the spoofer level of C/No is equal to 60 db-Hz and a noise floor jammer is equal to 60 db J/S, In other words, the spoofer signal transmission can include a 60 dB J/S noise jammer. The spoofer signal is at 45 degrees azimuth and 45 degrees elevation. The simulation is run for 100 seconds with the GPS satellite tracking channel locked onto the spoofer signal. In this case, at an initial time, the GPS receiver's tracking channel C/No measurement is at 60 db-Hz. In other words, the 60 db-Hz measurement is before spoofer mitigation data is applied to the GPS receiver tracking channel. The measured signal level of 60 db-Hz is above the Costas tracking loop threshold level of 26 db-Hz. At 10 seconds into the simulation, the spoofer mitigation data is applied to the GPS satellite tracking channel, which results in the GPS satellite tracking channel placing a spatial null in the direction of the spoofer signal transmission.

In one example, the GPS satellite track channel can already begin to null the spoofer due to the high noise floor jamming that was transmitted along with the spoofer. The addition of the spoofer mitigation signal to the GPS satellite track channel can result in a spoofer C/No suppression of approximately 50 db, to an average value of approximately 10 db-Hz or less, which is below the 26 db-Hz Costas loop tracking threshold. When the GPS receiver's track channel control logic determines that a spoofer signal has been detected and that the spoofer mitigation data has been applied to the GPS satellite track channel, the track channel control logic can initiate a satellite reacquisition search to re-establish proper satellite tracking. The presence of the spoofer mitigation data can enable the GPS satellite track channel to reacquire a correct satellite, despite the spoofer signal level being higher than the satellite signal.

Figure 7:
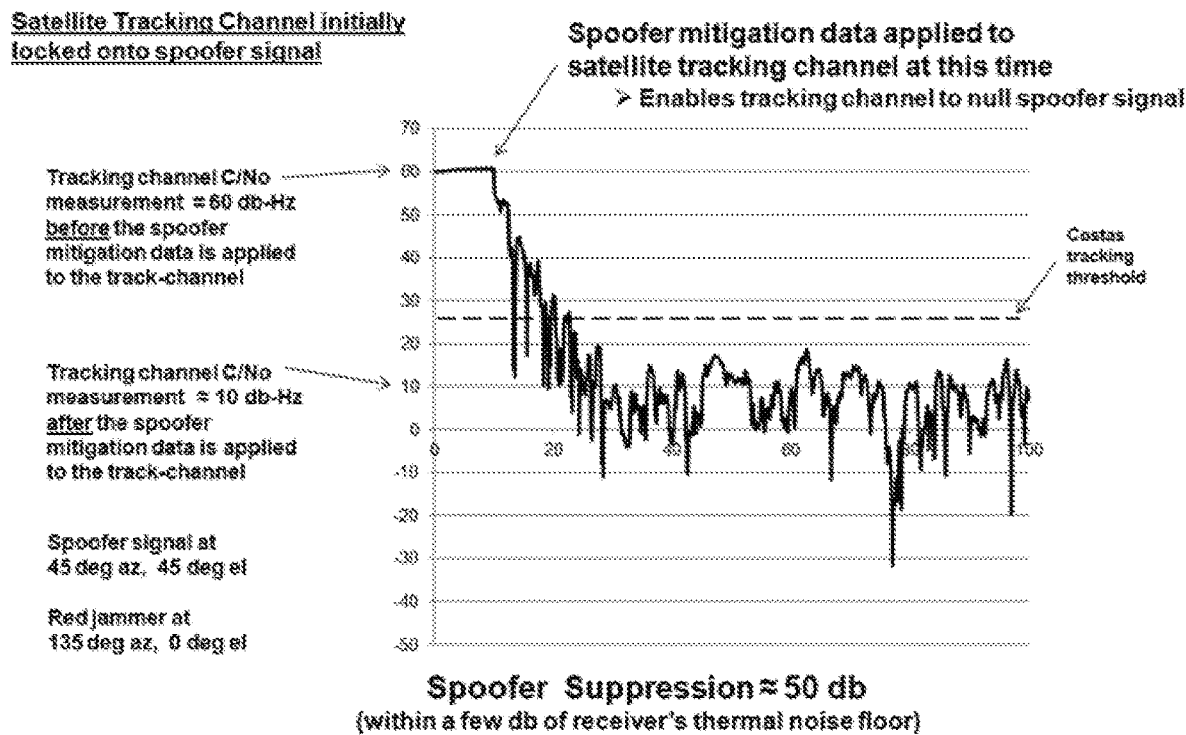
FIG. 7 illustrates simulation results for a defined spoofer level and hostile jamming in accordance with an example.

FIG. 7 illustrates exemplary simulation results for a defined spoofer level and hostile jamming. The simulation results illustrate an adapted antenna pattern gain scaled to an input C/No value. As shown in FIG. 7, the spoofer level is C/No=60 db-Hz in the presence of a 60 db J/S hostile jammer. The spoofer signal is at 45 degrees azimuth and 45 degrees elevation, and the hostile jammer (or red jammer) is at 135 degrees azimuth and 0 degrees elevation. The simulation is run for 100 seconds with the GPS satellite tracking channel locked onto the spoofer signal. In this case, at an initial time, the GPS receiver's tracking channel C/No measurement is at 60 db-Hz. In other words, the 60 db-Hz measurement is before spoofer mitigation data is applied to the GPS receiver tracking channel. The measured signal level of 60 db-Hz is above the Costas tracking loop threshold level of 26 db-Hz. At 10 seconds into the simulation, the spoofer mitigation data is applied to the GPS satellite tracking channel, which results in the GPS satellite tracking channel placing a spatial null in the direction of the spoofer signal transmission.

In one example, the combined jammer plus the spoofer signal is nulled down to approximately 10 db-Hz, which enables the GPS receiver to properly track the correct satellite signal. This capability would not be possible with a technique that attempts to detect the presence of a spoofer by measuring the phase angle of the spoofer signal at each CRPA element output. The initial transient at the beginning of the simulation is due to the use of a least mean square (LMS) spoofer loop nulling algorithm. Alternatively, a minimum variance nulling algorithm can be employed in the GPS receiver to null the jammer plus the spoofer mitigation signal, which can provide a nulling time response of a few milliseconds.

In one configuration, spoofer nulling weights can form a direction vector (or pointing vector) that points in the direction of the spoofer signal transmission. In operational use, the direction vector can be compared to the INS beamsteering vector that is used by the GPS receiver to point an antenna beam towards the GPS satellite. By comparing these two vectors, it can be determined if the GPS satellite tracking channel is tracking the correct satellite or tracking a spoofer that has managed to "take control" of the GPS receiver. If there is no hostile jamming present, then the spoofer nulling weights can form the direction vector that points in the direction of the spoofer signal. In this case, the direction vector can readily be used to determine the spatial direction of arrival of the spoofer signal. However, for the case where there is hostile jamming present, in addition to the spoofer, these spoofer nulling weights can place spatial nulls in the direction of both the spoofer and the jammers. In addition, for an N element antenna, there are N−1 degrees of freedom available to form N−1 spatial nulls, wherein N is an integer. Thus, a 7 element antenna array can form up to 6 spatial nulls, which can be comprised of 1 null in the direction of the spoofer with the remaining 5 nulls in the direction of 5 hostile jammers. In this case, another mechanism can be employed to determine the direction of arrival of the spoofer.

One technique that can be used to determine the direction of arrival of the spoofer, when hostile jamming is present, is to form an antenna sky map, which can reveal the spatial nulls that are present. The antenna sky map can show deep spatial nulls that are formed in the direction of both the spoofer signal transmission and the hostile jammer. The surface of the antenna sky map can be searched to identify the direction of arrival of each spatial null. To differentiate the spoofer from the jammers, a spoofer correlation function can periodically be disrupted which can cause the spatial null in the direction of the spoofer to disappear. This can be accomplished by periodically shifting a timing of a pseudo noise (PN) code, or the "address" of the coder used to generate the code for correlating with the spoofer (or satellite), so that correlation does not occur. In this case, no correlation occurs since the GPS satellite or spoofer signal level is typically 20 to 30 db below a thermal noise in the GPS receiver.

Figure 8:
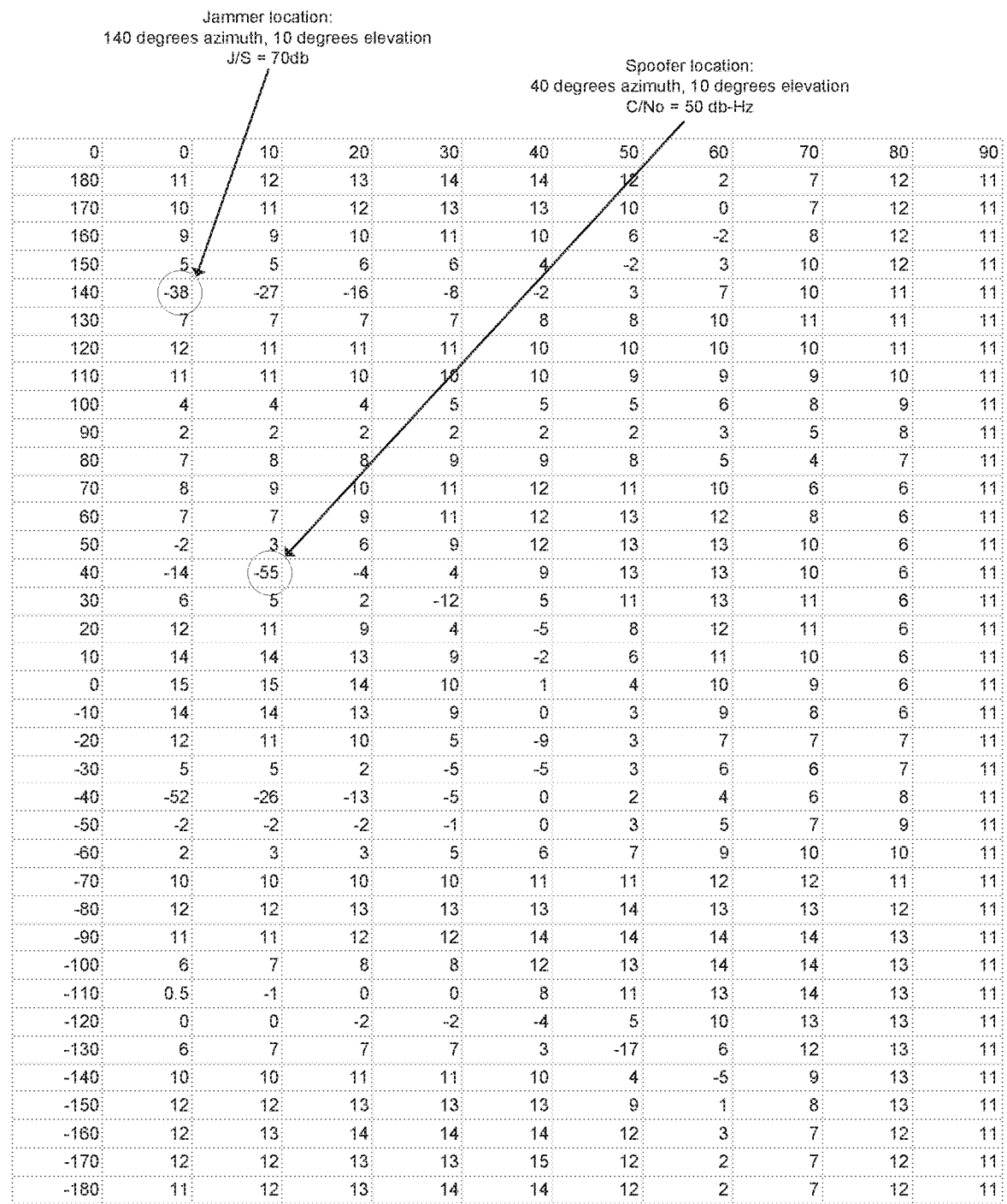
FIG. 8 illustrates an antenna sky map pattern using spoofer nulling weights in accordance with an example.

FIG. 8 illustrates an exemplary antenna sky map pattern using spoofer nulling weights. The antenna sky map pattern can be used to determine the direction of arrival of a spoofer, for the case of a spoofer and one jammer. The antenna sky map pattern can show that deep spatial nulls are formed in the direction of both the spoofer signal transmission and the hostile jammer. In this example, the spoofer is located at 40 degrees azimuth and 10 degrees above the horizon, and the spoofer is associated with a C/No value of 50 db-Hz. A 70 db J/S jammer is located at 140 degrees azimuth and on the horizon. The vertical axis shows the azimuth of the spoofer or jammer with 0 degrees representing north and 90 degrees representing east. The horizontal axis shows elevation with 0 degrees representing the horizon and 90 degrees representing the zenith. The values shown in the antenna sky map are the adapted antenna pattern gain (in db). In the example, the large gain values reflect an artifact where a nulling weight normalization was not employed. In addition, it is the relative gain values that are of interest here, with the minimum values representing the locations of the spoofer or jammers.

As shown in FIG. 8, the spoofer (which has been converted into a jammer using the spoofer auto-tracking and mitigation technique) produces a 55 db null depth in the direction of the spoofer. The 70 db J/S jammer forms a 38 db null depth in the direction of the jammer.

FIG. 9 illustrates an exemplary antenna sky map pattern using spoofer nulling weights. In particular, the antenna sky map pattern shows a sharpness of a spatial null in the direction of a spoofer. The antenna sky map pattern can be centered around an azimuth and elevation of the spoofer. The antenna sky map pattern is presented in 1 degree increments of azimuth and elevation. As shown, as little as a 1 degree change on azimuth or elevation results in a significant loss in null depth.

Figure 10:
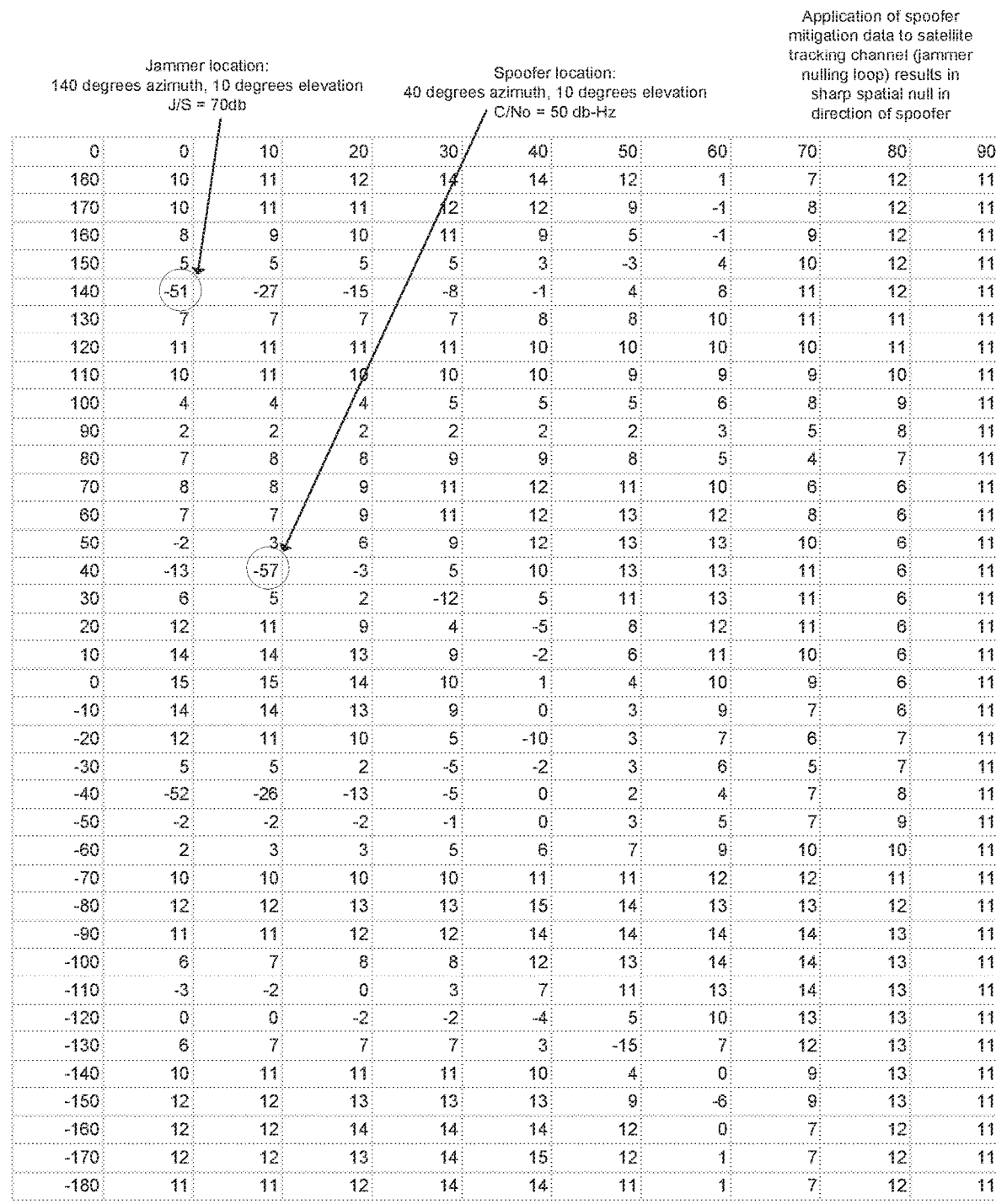
FIG. 10 illustrates an antenna sky map pattern using spoofer nulling weights in accordance with an example.

FIG. 10 illustrates an exemplary antenna sky map pattern using spoofer nulling weights. The antenna sky map pattern can be used to determine the direction of arrival of a spoofer. The application of a derived GPS spoofer mitigation jamming signal to a GPS satellite tracking channel can result in a sharp spatial null in the direction of the spoofer in a satellite tracking channel adapted antenna pattern.

As shown in FIG. 10, both the jammer and the spoofer can result in a deep spatial null, which are in the same location as the spatial nulls shown in FIG. 8. The results shown in FIG. 10 validates the concept of deriving a spoofer mitigation jamming signal, using an inner loop in a GPS receiver, and applying the inner loop to form a sharp spatial null in the direction of the spoofer in the satellite tracking outer loop of the GPS receiver. In one example, the null depth in the direction of the jammer in FIG. 10 is deeper than the null depth for the jammer in FIG. 8. This is a result of a reduced jammer energy that is passed through a low pass filter (LPF), which is used in converting the spoofer into a jammer in the inner loop of the GPS receiver. Also, between FIG. 10 and FIG. 8, the null depth in the direction of the spoofer is a few db different since the thermal noise is slightly different between the inner and outer loops.

In one example, an application can be used to automatically search the antenna sky map and return a correct spoofer azimuth and elevation of the spoofer, as well as a difference between the spoofer and jammer azimuth and elevation.

Figure 11:
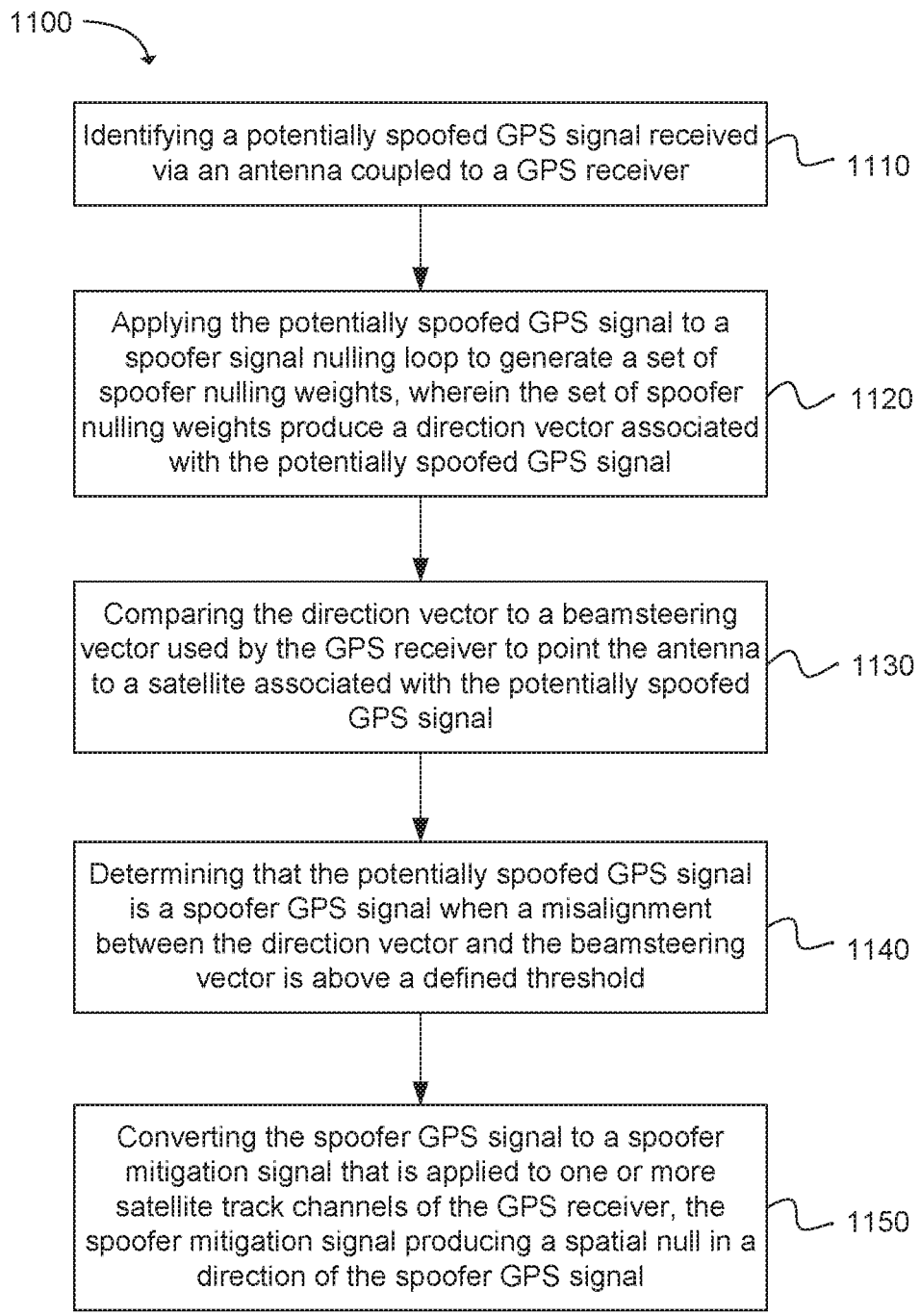
FIG. 11 depicts a flowchart of a method for mitigating global positioning system (GPS) spoofer signals in accordance with an example.

FIG. 11 illustrates a method for mitigating global positioning system (GPS) spoofer signals. The method can be executed as instructions on a machine, where the instructions are included on at least one computer readable medium or one non-transitory machine readable storage medium. The method can include the operation of identifying a potentially spoofed GPS signal received via an antenna coupled to a GPS receiver, as shown in block 1110. The method can include the operation of applying the potentially spoofed GPS signal to a spoofer signal nulling loop to generate a set of spoofer nulling weights, wherein the set of spoofer nulling weights produce a direction vector associated with the potentially spoofed GPS signal, as in block 1120. The method can include the operation of comparing the direction vector to a beamsteering vector used by the GPS receiver to point the antenna to a satellite associated with the potentially spoofed GPS signal, as in block 1130. The method can include the operation of determining that the potentially spoofed GPS signal is a spoofer GPS signal when a misalignment between the direction vector and the beamsteering vector is above a defined threshold, as in block 1140. The method can include the operation of converting the spoofer GPS signal to a spoofer mitigation signal that is applied to one or more satellite track channels of the GPS receiver, the spoofer mitigation signal producing a spatial null in a direction of the spoofer GPS signal, as in block 1150.

In one example, the method can further include the operations of removing data bits from the potentially spoofed GPS signal; and providing a potentially spoofed GPS signal with removed data bits to a low pass filter on a narrow band path to produce a low pass filtered spoofer GPS signal.

In one example, the low pass filtered spoofer GPS signal is used to generate the spoofer mitigation signal, wherein the narrow band path provides a reduced signal-to-noise ratio (SNR) when generating the spoofer mitigation signal, wherein the spoofer mitigation signal is read as a jamming signal to the one or more satellite track channels of the GPS receiver.

In one example, the low pass filtered spoofer GPS signal is applied to the spoofer signal nulling loop to generate the set of spoofer nulling weights.

In one example, the method can further include the operation of applying a complex Gaussian noise modulator to the low pass filtered spoofer GPS signal prior to generating the set of spoofer nulling weights.

In one example, the spoofer signal nulling loop is a least mean square (LMS) nulling loop or a minimum variance nulling loop.

In one example, the method can further include the operation of tracking the potentially spoofed GPS signal using a wideband signal path of the GPS receiver.

In one example, multiple spoofer signal nulling loops are utilized at the GPS receiver to mitigate a spoofer attack from multiple directions.

In one example, the antenna is a multi-element antenna or a control pattern reception antenna (CRPA).

In one example, the GPS receiver is onboard an aircraft or a self-propelled precision-guided munition system.

Figure 12:
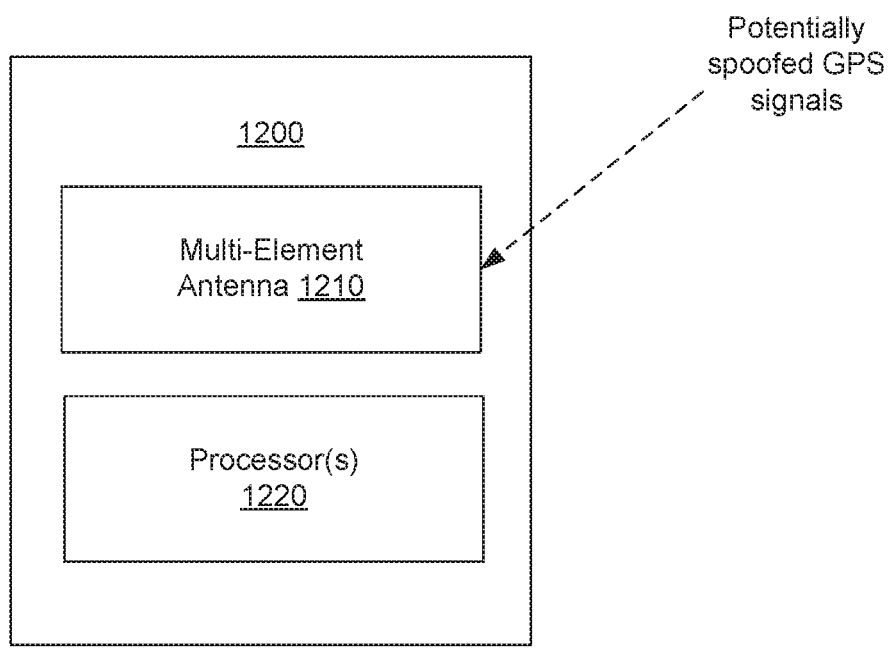
FIG. 12 depicts a system for mitigating global positioning system (GPS) spoofer signals in accordance with an example.

FIG. 12 depicts an exemplary system 1200 for mitigating global positioning system (GPS) spoofer signals. The system 1200 can include a multi-element antenna 1210 operable to detect a potentially spoofed GPS signal. The system 1200 can include one or more processors 1220 configured to apply the potentially spoofed GPS signal to a spoofer signal nulling loop to generate a set of spoofer nulling weights, wherein the set of spoofer nulling weights produce a first vector in a direction of the potentially spoofed GPS signal. The system 1200 can include one or more processors 1220 configured to compare the first vector to a second vector that points the multi-element antenna 1210 to a satellite associated with the potentially spoofed GPS signal. The system 1200 can include one or more processors 1220 configured to determine that the potentially spoofed GPS signal is a spoofer GPS signal when a misalignment between the first vector and the second vector is above a defined threshold. The system 1200 can include one or more processors 1220 configured to generate a spoofer mitigation signal from the spoofer GPS signal, wherein the spoofer mitigation signal produces a spatial null in a direction of the spoofer GPS signal and causes the multi-element antenna 1210 to not detect the spoofer GPS signal.

In one example, the one or more processors 1220 are further configured to apply the spoofer mitigation signal to one or more satellite track channels, wherein the spoofer mitigation signal is read as a jamming signal to the one or more satellite track channels.

In one example, the one or more processors 1220 are further configured to remove a data message from the potentially spoofed GPS signal; and provide a potentially spoofed GPS signal with removed data bits to a low pass filter on a narrow band path to produce a low pass filtered spoofer GPS signal.

In one example, the low pass filtered spoofer GPS signal is used to generate the spoofer mitigation signal, wherein the narrow band path provides a reduced signal-to-noise ratio (SNR) when generating the spoofer mitigation signal.

In one example, the low pass filtered spoofer GPS signal is applied to the spoofer signal nulling loop to generate the set of spoofer nulling weights.

In one example, the one or more processors 1220 are further configured to apply a complex Gaussian noise modulator to the low pass filtered spoofer GPS signal prior to generating the set of spoofer nulling weights.

In one example, the spoofer signal nulling loop is a least mean square (LMS) nulling loop or a minimum variance nulling loop.

In one example, the one or more processors 1220 are further configured to track the potentially spoofed GPS signal using a wideband signal path of the GPS receiver.

In one example, the second vector is an inertial navigation system (INS) beamsteering vector that points the multi-element antenna 1210 to the satellite associated with the potentially spoofed GPS signal.

Figure 13:
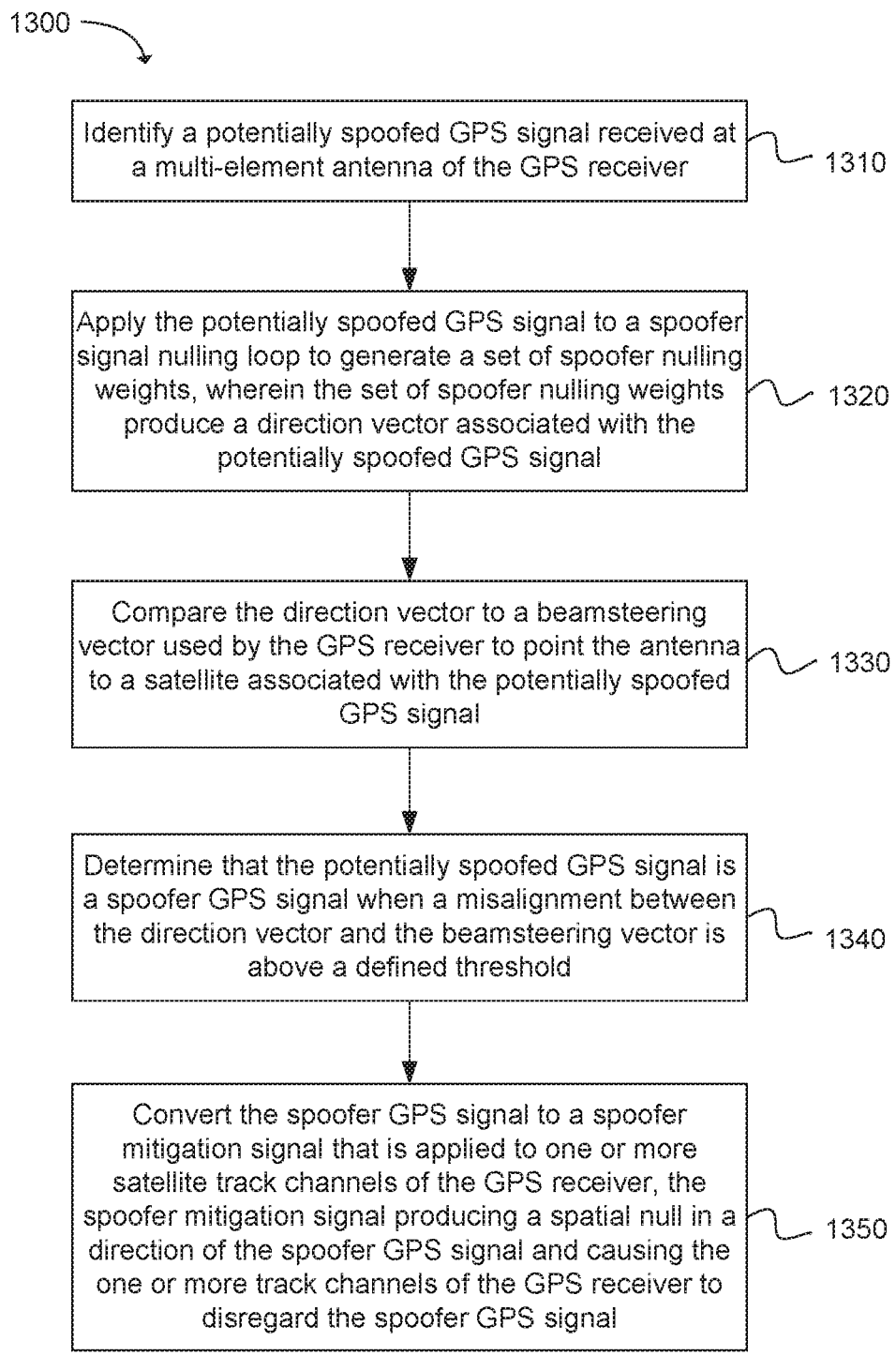
FIG. 13 depicts functionality of a global position system (GPS) receiver operable to mitigate GPS spoofer signals in accordance with an example.

FIG. 13 depicts functionality of an exemplary global position system (GPS) receiver operable to mitigate GPS spoofer signals. The GPS receiver can comprise one or more processors and memory configured to identify a potentially spoofed GPS signal received at a multi-element antenna of the GPS receiver, as in block 1310. The GPS receiver can comprise one or more processors and memory configured to apply the potentially spoofed GPS signal to a spoofer signal nulling loop to generate a set of spoofer nulling weights, wherein the set of spoofer nulling weights produce a direction vector associated with the potentially spoofed GPS signal, as in block 1320. The GPS receiver can comprise one or more processors and memory configured to compare the direction vector to a beamsteering vector used by the GPS receiver to point the antenna to a satellite associated with the potentially spoofed GPS signal, as in block 1330. The GPS receiver can comprise one or more processors and memory configured to determine that the potentially spoofed GPS signal is a spoofer GPS signal when a misalignment between the direction vector and the beamsteering vector is above a defined threshold, as in block 1340. The GPS receiver can comprise one or more processors and memory configured to convert the spoofer GPS signal to a spoofer mitigation signal that is applied to one or more satellite track channels of the GPS receiver, the spoofer mitigation signal producing a spatial null in a direction of the spoofer GPS signal and causing the one or more track channels of the GPS receiver to disregard the spoofer GPS signal, as in block 1350.

In one example, the GPS receiver is further configured to remove data bits from the potentially spoofed GPS signal; and provide a potentially spoofed GPS signal with removed data bits to a low pass filter on a narrow band path to produce a low pass filtered spoofer GPS signal, wherein the low pass filtered spoofer GPS signal is applied to the spoofer signal nulling loop to generate the set of spoofer nulling weights.

In one example, the low pass filtered spoofer GPS signal is used to generate the spoofer mitigation signal, wherein the spoofer mitigation signal is read as a jamming signal to the one or more satellite track channels of the GPS receiver.

It will be apparent to those skilled in the art that the GPS receiver can be located onboard, and the present technology can be implemented on, an aircraft or a self-propelled precision-guided munition system. However, it will also be apparent to those skilled in the art that the GPS receiver can be associated with, and the present technology can be implemented in, any commercial, military, or private aircraft or vehicle or other system. As such, the examples used and discussed herein are not intended to be limiting in any way.

Various techniques, or certain aspects or portions thereof, may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" or "configuration" means that a particular feature, structure, or characteristic described in connection with the example is included in at least one embodiment of the present invention. Thus, appearances of the phrases "in an example" or "in a configuration" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for mitigating global positioning system (GPS) spoofer signals, the method comprising:
   receiving, using one or more processors of the GPS receiver, a GPS signal via an antenna coupled to a GPS receiver;
   removing data bits from the GPS signal;
   providing the GPS signal with removed data bits to a low pass filter on a narrow band path to produce a low pass filtered spoofer GPS signal;
   generating a set of spoofer nulling weights using the low pass filtered spoofer GPS signal;
   producing a direction vector associated with the GPS signal by applying the set of spoofer nulling weights to the GPS signal;
   comparing, using the one or more processors of the GPS receiver, the direction vector to an inertial navigation system (INS) beamsteering vector;
   determining, using the one or more processors of the GPS receiver, that the GPS signal is a spoofer GPS signal when a misalignment between the direction vector and the INS beamsteering vector is above a defined threshold;
   generating a spoofer mitigation signal using the low pass filtered spoofer GPS signal;
   applying the spoofer mitigation signal to one or more satellite track channels of the GPS receiver, the spoofer mitigation signal producing a spatial null in a direction of the spoofer GPS signal;
   forming an antenna sky map using the spoofer nulling weights when the GPS receiver is subjected to a hostile jamming signal, wherein the hostile jamming signal is separate from the spoofer GPS signal;
   identifying, using the antenna sky map, a spatial null in a direction of the hostile jamming signal; and
   disrupting a spoofer correlation function associated with the spoofer GPS signal to differentiate between the spatial null associated with the spoofer GPS signal and the spatial null associated with the hostile jamming signal.

2. The method of claim 1, wherein the narrow band path provides a reduced signal-to-noise ratio (SNR) when generating the spoofer mitigation signal, wherein the spoofer mitigation signal is read as the jamming signal to the one or more satellite track channels of the GPS receiver.

3. The method of claim 1, further comprising applying a complex Gaussian noise modulator to the low pass filtered spoofer GPS signal prior to generating the set of spoofer nulling weights.

4. The method of claim 1, further comprising generating the spoofer mitigation signal using least mean square (LMS) loop nulling or minimum variance nulling.

5. The method of claim 1, further comprising tracking the GPS signal using a wideband signal path of the GPS receiver.

6. The method of claim 1, further comprising mitigating a spoofer attack from multiple directions using the GPS receiver.

7. The method of claim 1, wherein the antenna is a multi-element antenna or a control pattern reception antenna (CRPA).

8. The method of claim 1, wherein the GPS receiver is onboard an aircraft or a self-propelled precision-guided munition system.

9. A system for mitigating global positioning system (GPS) spoofer signals, the system comprising:
   a multi-element antenna operable to receive a GPS signal;
   one or more processors configured to:
      remove data bits from the GPS signal;
      provide the GPS signal with removed data bits to a low pass filter on a narrow band path to produce a low pass filtered spoofer GPS signal;
      generate a set of spoofer nulling weights using the low pass filtered spoofer GPS signal;
      produce a first vector associated with the GPS signal by applying the set of spoofer nulling weights to the GPS signal;

compare the first vector to a second vector, wherein the second vector is an inertial navigation system (INS) beamsteering vector;

determine that the GPS signal is a spoofer GPS signal when a misalignment between the first vector and the second vector is above a defined threshold;

generate a spoofer mitigation signal using the low pass filtered spoofer GPS signal, wherein the spoofer mitigation signal produces a spatial null in a direction of the spoofer GPS signal;

form an antenna sky map using the spoofer nulling weights when hostile jamming is present;

identify, using the antenna sky map, a spatial null in a direction of a received hostile jamming signal, wherein the hostile jamming signal is separate from the spoofer GPS signal; and disrupt a spoofer correlation function associated with the spoofer GPS signal to differentiate between the spatial null associated with the spoofer GPS signal and the spatial null associated with the hostile jamming signal.

10. The system of claim 9, wherein the one or more processors are further configured to apply the spoofer mitigation signal to one or more satellite track channels, wherein the spoofer mitigation signal is read as a jamming signal to the one or more satellite track channels.

11. The system of claim 9, wherein the narrow band path provides a reduced signal-to-noise ratio (SNR) when generating the spoofer mitigation signal.

12. The system of claim 9, wherein the one or more processors are further configured to apply a complex Gaussian noise modulator to the low pass filtered spoofer GPS signal prior to generating the set of spoofer nulling weights.

13. The system of claim 9, wherein the one or more processors are further configured to generate the spoofer mitigation signal using least mean square (LMS) spoofer loop nulling or minimum variance nulling.

14. The system of claim 9, wherein the one or more processors are further configured to track the GPS signal using a wideband signal path of a GPS receiver.

15. The system of claim 9, wherein the second vector is an inertial navigation system (INS) beamsteering vector that points the multi-element antenna to the satellite associated with the GPS signal.

16. A global position system (GPS) receiver operable to mitigate GPS spoofer signals, the GPS receiver comprising one or more processors and memory configured to:
receive a GPS signal at a multi-element antenna of the GPS receiver;
remove data bits from the GPS signal;
provide the GPS signal with removed data bits to a low pass filter on a narrow band path to produce a low pass filtered spoofer GPS signal;
generate a set of spoofer nulling weights using the low pass filtered spoofer GPS signal;
produce a direction vector associated with the GPS signal by applying the set of spoofer nulling weights to the GPS signal;
compare the direction vector to an inertial navigation system (INS) beamsteering vector;
determine that the GPS signal is a spoofer GPS signal when a misalignment between the direction vector and the INS beamsteering vector is above a defined threshold;
generate a spoofer mitigation signal using the low pass filtered spoofer GPS signal;
apply the spoofer mitigation signal to one or more satellite track channels of the GPS receiver, the spoofer mitigation signal producing a spatial null in a direction of the spoofer GPS signal and causing the one or more track channels of the GPS receiver to disregard the spoofer GPS signal;
form an antenna sky map using the spoofer nulling weights when the GPS receiver is subjected to a hostile jamming signal;
identify, using the antenna sky map, a spatial null in a direction of the hostile jamming signal, wherein the hostile jamming signal is separate from the spoofer GPS signal; and
disrupt a spoofer correlation function associated with the spoofer GPS signal to differentiate between the spatial null associated with the spoofer GPS signal and the spatial null associated with the hostile jamming signal.

17. The GPS receiver of claim 16, wherein the spoofer mitigation signal is read as the jamming signal to the one or more satellite track channels of the GPS receiver.

18. The GPS receiver of claim 16, wherein the GPS receiver is onboard an aircraft or a self-propelled precision-guided munition system.

* * * * *